United States Patent
Vigliano

(10) Patent No.: US 9,117,554 B2
(45) Date of Patent: Aug. 25, 2015

(54) CORE SHROUD WELD INSPECTION SYSTEMS AND METHODS

(75) Inventor: Vincent Carl Vigliano, Wilmington, NC (US)

(73) Assignee: GE-Hitachi Nuclear Energy Americas LLC, Wilmington, DE (US)

( * ) Notice: Subject to any disclaimer, the term of this patent is extended or adjusted under 35 U.S.C. 154(b) by 904 days.

(21) Appl. No.: 12/958,489

(22) Filed: Dec. 2, 2010

(65) Prior Publication Data

US 2012/0140865 A1 Jun. 7, 2012

(51) Int. Cl.
| | | |
|---|---|---|
| G21C 17/00 | (2006.01) |
| G21C 17/003 | (2006.01) |
| G21C 17/013 | (2006.01) |
| G21C 17/07 | (2006.01) |
| G21C 5/10 | (2006.01) |

(52) U.S. Cl.
CPC ............ *G21C 17/003* (2013.01); *G21C 17/013* (2013.01); *G21C 5/10* (2013.01); *G21C 17/07* (2013.01)

(58) Field of Classification Search
CPC .. G21C 17/007; G21C 7/0131; G21C 17/003; G21C 5/10
USPC ........................................................ 376/249
See application file for complete search history.

(56) References Cited

U.S. PATENT DOCUMENTS

| | | | | |
|---|---|---|---|---|
| 3,987,666 A * | 10/1976 | Blanc et al. | ..................... | 73/633 |
| 4,330,865 A | 5/1982 | Hyde et al. | | |
| 4,966,746 A * | 10/1990 | Richardson et al. | .......... | 376/249 |
| 5,009,105 A * | 4/1991 | Richardson et al. | ............ | 73/621 |
| 5,169,593 A * | 12/1992 | Kazirskis et al. | ............. | 376/260 |
| 5,586,155 A * | 12/1996 | Erbes et al. | ................... | 376/249 |
| 7,587,942 B2 | 9/2009 | Smith et al. | | |
| 7,769,123 B2 * | 8/2010 | Rowell et al. | ................. | 376/249 |
| 2002/0064250 A1 | 5/2002 | Kurosawa et al. | | |
| 2009/0314089 A1 * | 12/2009 | Brignac et al. | ................. | 73/622 |

FOREIGN PATENT DOCUMENTS

| | | |
|---|---|---|
| JP | 61021963 U1 | 2/1986 |
| JP | 08201568 A | 8/1996 |
| JP | 10319170 A | 12/1998 |
| JP | 11160295 A | 6/1999 |
| JP | H11-160295 A | 6/1999 |
| JP | 2008008693 A | 1/2008 |
| JP | 2008145432 A | 6/2008 |

OTHER PUBLICATIONS

An Unofficial English translation of a JP Office Action issued in connection with corresponding JP Patent Application No. 2011-258403 dated Dec. 3, 2013.
EP Search Report and Written Opinion dated Feb. 25, 2014, issued in connection with corresponding EP Patent Application No. 11190924.8.
Taiwan Office Action dated Feb. 2, 2015 in related matter.

* cited by examiner

*Primary Examiner* — Frank J McGue
(74) *Attorney, Agent, or Firm* — Parks Wood LLC; Stephen J. Terrell

(57) ABSTRACT

An inspection system for inspecting a core shroud includes a remotely operated vehicle with a profile, scanning ability, and reliability that contribute to expanded inspection coverage and reduced inspection times.

17 Claims, 5 Drawing Sheets

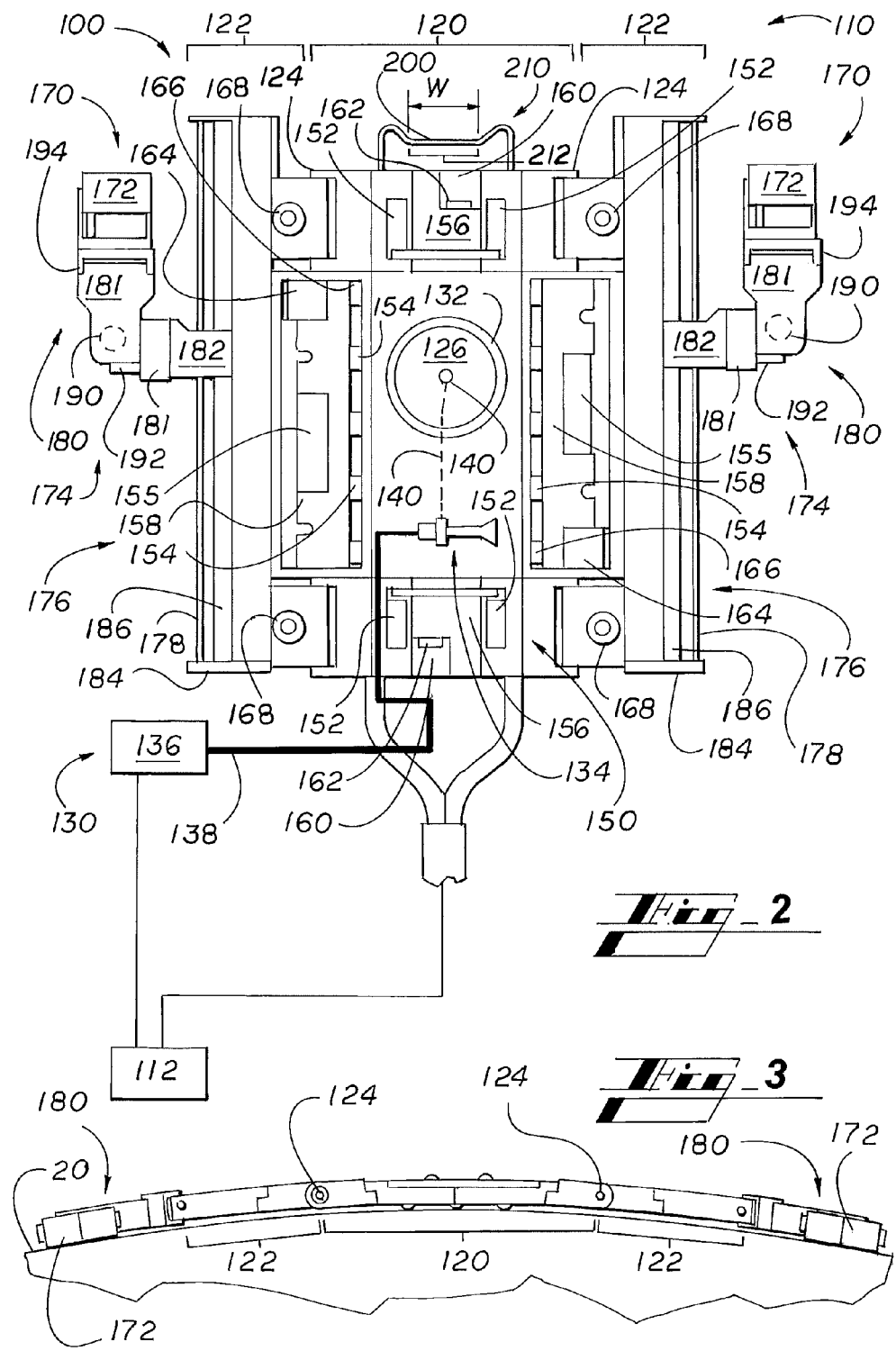

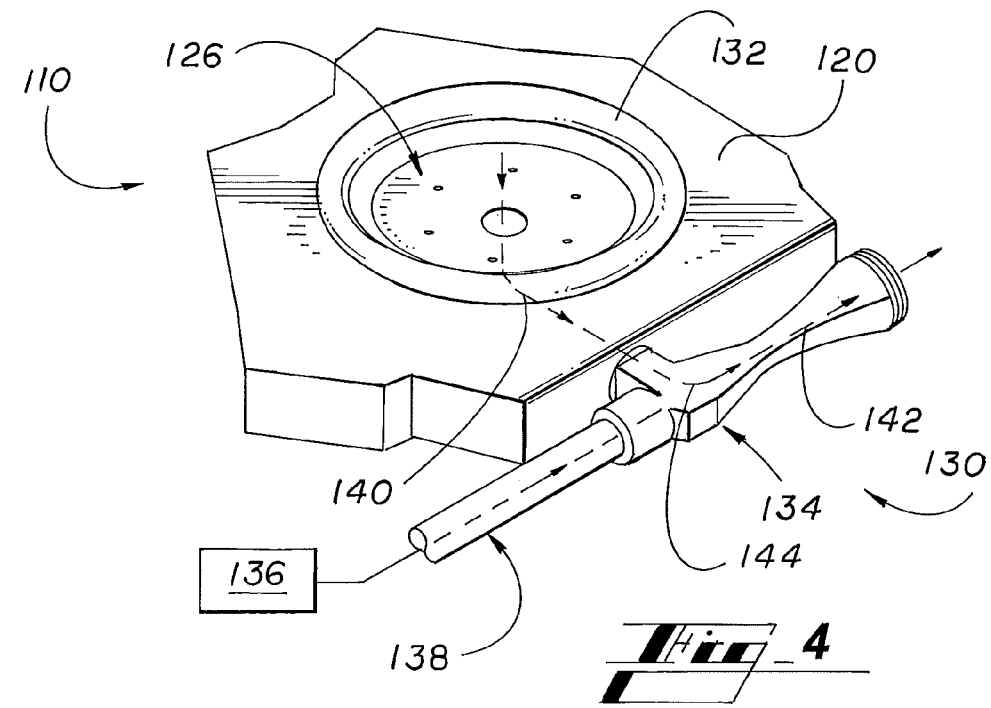
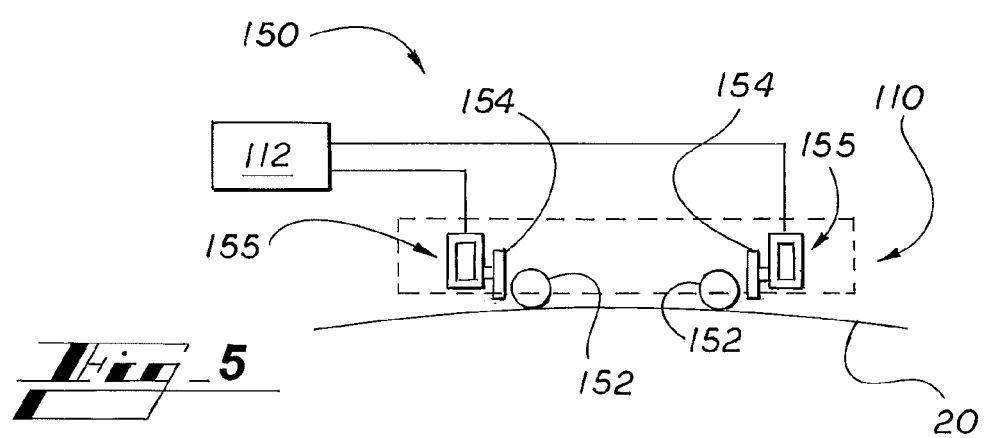
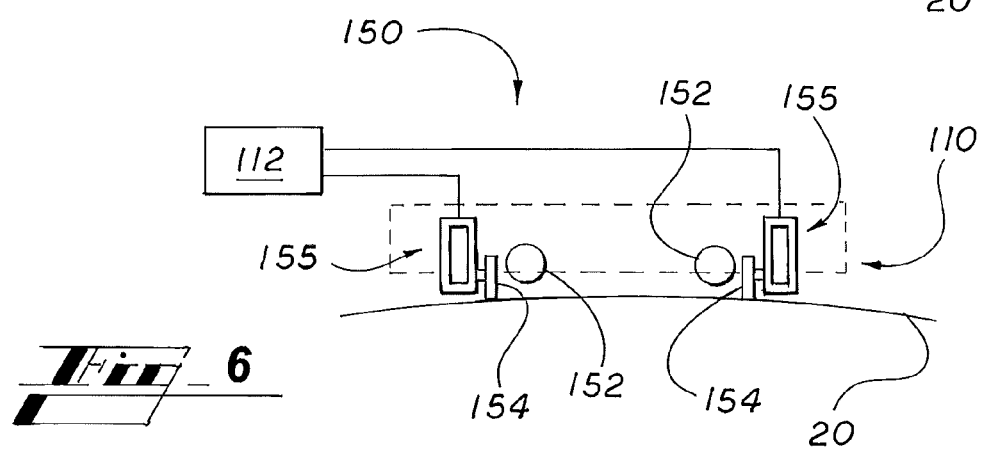

CORE SHROUD WELD INSPECTION SYSTEMS AND METHODS

TECHNICAL FIELD

The technical field is generally systems and methods for inspecting underwater structures and, more specifically, systems and methods for inspecting the welds of a core shroud of a boiling water reactor.

BACKGROUND

Boiling water reactors (BWRs) need to be inspected for purposes of safety and maintenance. Particularly, the welds of the core shroud of the BWR need to be inspected in order to identify intergranular stress corrosion cracking (IGSCC). Inspections are commonly performed during outages of a reactor unit using visual inspection methods and ultrasonic probes. The ultrasonic probes measure the length and depth of cracks in the welds.

Most BWRs include various structures such as jet pumps that make it difficult for currently available inspection devices to access certain weld locations on the core shroud. Also all BWR's are unique making it difficult for a single tool to be able to inspect the entire BWR fleet. BWR core shrouds contain different diameter barrels which decrease as depth increases. The resulting ledges and variation in diameters make accessibility a challenge.

Inspection tooling is generally rigorously designed to minimize the chance for debris to be dropped or lost in the reactor. Most inspection tooling is custom designed to maximize accessibility while preventing loss of material and minimizing breakdowns. Breakdowns of tooling can be costly in terms of increased time to inspect the BWR.

Remotely operated vehicles (ROV) are generally too large to be used to inspect the core shroud, mostly due to the fact that they must be submersible to one hundred feet. Thrust fans are commonly used on an ROV to hold it against the core shroud. The thrust fans that are needed to produce the required thrust force increase the size of the ROV thereby limiting its accessibility. Thrust fans also increase the number of moving parts to risk both failure and potential for loss of parts in the reactor.

SUMMARY

The various embodiments provide systems and methods for inspecting a core shroud of a nuclear reactor. According to an exemplary embodiment, an inspecting remotely operated vehicle (ROV) is configured to move behind structures adjacent the outer diameter of the core shroud of a boiling water reactor (BWR) and to attach to the core shroud of the BWR without the use of moving parts. The ROV is configured to efficiently inspect welds of the core shroud since it does not have to be removed from the surface of the core shroud as often by a telescoping device in order to cover different positions on the core shroud, does not have to be removed and reconfigured to inspect differently oriented welds, and does not have to be removed for maintenance as often since it has fewer moving parts. Thus, the ROV makes inspection more cost effective and efficient. The low profile, the scanning ability, and the increased reliability contribute to expanded inspection coverage and reduced inspection times.

According to an exemplary embodiment, an inspection system for inspecting a core shroud includes a remotely operated vehicle that is configured to conform to the surface of the core shroud to minimize the height of the remotely operated vehicle as measured from the surface of the core shroud. In certain embodiments, the profile of the remotely operated vehicle is curved so as to conform to the surface of the core shroud and, in certain embodiments, the remotely operated vehicle includes an abdomen connected to a wing by a spring loaded hinge. The remotely operated vehicle of the exemplary embodiment further includes, in certain embodiments, one or more of an ultrasonic probe and a probe positioning system that is configured to translate and rotate the ultrasonic probe; a set of horizontal wheels that are configured to move the remotely operated vehicle around the circumference of the core shroud and a set of vertical wheels that are configured to move the remotely operated vehicle along the axis of the core shroud; a handle that is configured to guide an installation arm to a flat middle portion of the handle; and a vacuum system configured to adhere the remotely operated vehicle to the surface of the core shroud. The vacuum system includes a venturi valve that is configured to draw water from a void in the remotely operated vehicle and a pump configured to supply water pressure to the venturi valve.

The foregoing has broadly outlined some of the aspects and features of the various embodiments, which should be construed to be merely illustrative of various potential applications. Other beneficial results can be obtained by applying the disclosed information in a different manner or by combining various aspects of the disclosed embodiments. Other aspects and a more comprehensive understanding may be obtained by referring to the detailed description of the exemplary embodiments taken in conjunction with the accompanying drawings, in addition to the scope defined by the claims.

DESCRIPTION OF THE DRAWINGS

FIG. 2 is a plan view of the ROV of FIG. 1.

FIG. 3 is an end elevation view of the ROV of FIG. 2.

FIG. 4 is a partial perspective view of a vacuum system of the ROV of FIG. 2.

FIGS. 5 and 6 are partial schematic end elevation views of a navigation system of the ROV of FIG. 2.

DETAILED DESCRIPTION

As required, detailed embodiments are disclosed herein. It must be understood that the disclosed embodiments are merely exemplary of and may be embodied in various and alternative forms, and combinations thereof. As used herein, the word "exemplary" is used expansively to refer to embodiments that serve as illustrations, specimens, models, or patterns. The figures are not necessarily to scale and some features may be exaggerated or minimized to show details of particular components. In other instances, components, systems, materials, or methods that are known to those having ordinary skill in the art have not been described in detail in order to avoid obscuring the present disclosure. Therefore, specific structural and functional details disclosed herein are not to be interpreted as limiting, but merely as a basis for the claims and as a representative basis for teaching one skilled in the art.

The exemplary embodiments are described herein in the context of a core shroud of a boiling water reactor (BWR). However, it will be apparent to one skilled in the art that the exemplary embodiments are applicable in other contexts including to other underwater structures. The embodiments described herein are configured with respect to an outer surface or outer diameter of a structure although the teachings herein can be applied to an inner surface or inner diameter of a structure.

Figure 1:
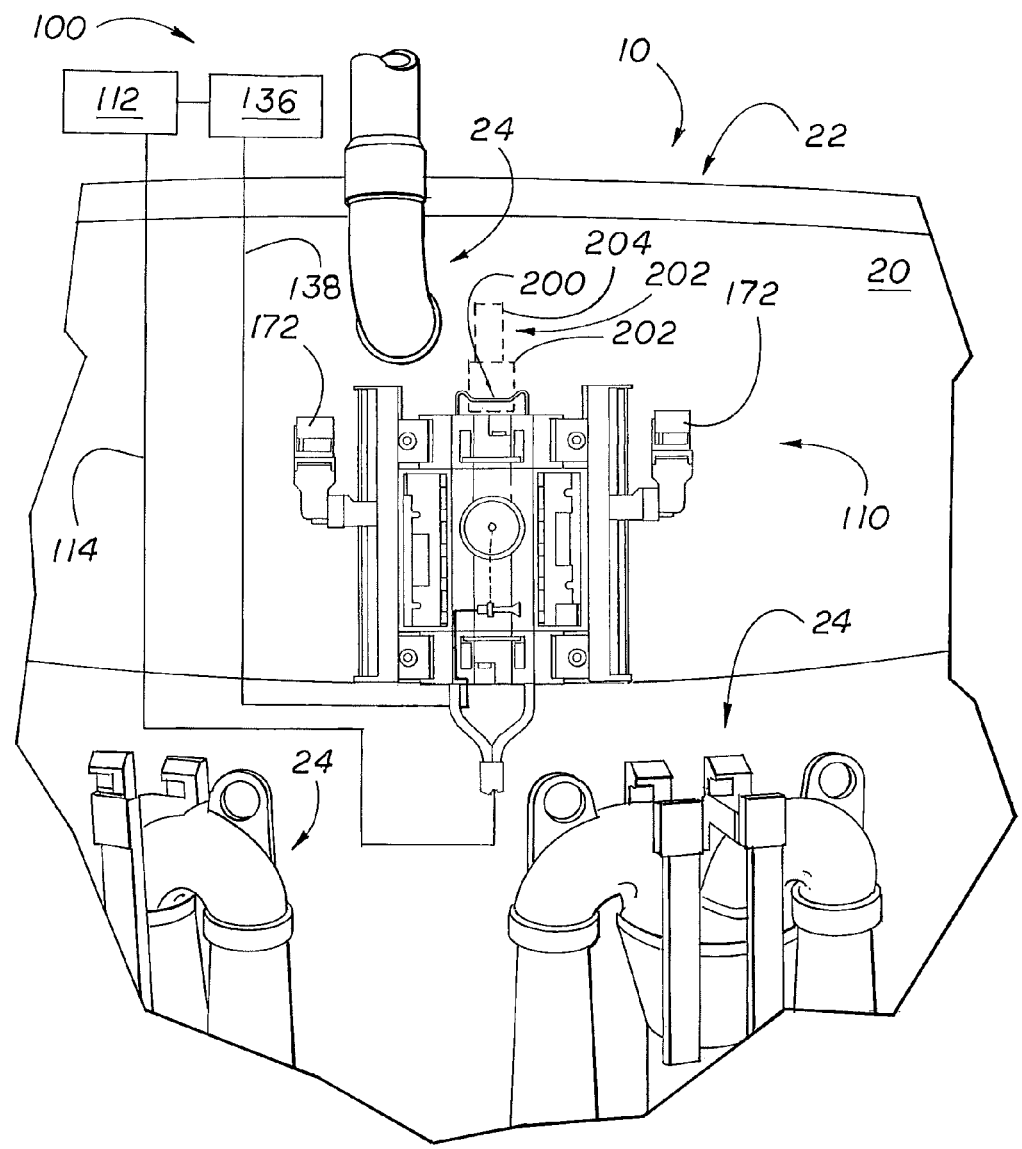
FIG. 1 is a partial perspective view of a boiling water reactor (BWR) and an inspection system that includes a remotely operated vehicle (ROV) on the outside of a core shroud of the BWR, according to an exemplary embodiment.

Referring to FIG. 1, a reactor pressure vessel (RPV) 10 of a BWR includes a core shroud 20. The core shroud 20 is a multi-diameter, tiered cylinder inside the RPV 10 that surrounds a reactor core 22. Generally described, the core shroud 20 guides the flow of coolant up through the reactor core 22 and provides support for a top guide, steam dryer, and core spray assembly. The RPV 10 includes various core shroud structures 24 such as jet pumps in an annulus. The core shroud 20 can be made, for example, from stainless steel with vertical and horizontal welds.

Referring to FIGS. 1-3, an inspection system 100 includes a remotely operated vehicle (ROV) 110 and a control unit 112 that controls the ROV 110. The ROV 110 is configured to conform to the profile of the outer surface of the core shroud 20, to attach to the outer surface of the core shroud 20, to navigate along the outer surface of the core shroud 20, and to inspect welds of the core shroud 20. To do such, the ROV 110 includes a vacuum system, a navigation system, and an inspection system described in further detail below. The control unit 112 is configured to control motors, pumps, and pistons and to receive feedback from motors and other sensors to position the ROV 110 and ultrasonic probes with respect to cracks in welds or other locations. Further, the control unit 112 is configured to control the ultrasonic probes to make measurements, for example, of the length and width of cracks. The connection between the control unit 112 and each of these elements is represented by cables 114.

The control unit 112 includes a processor and memory or other computer storage media that stores software modules. The software modules include computer executable instructions for controlling the systems described herein to perform methods described herein. While the methods described herein may, at times, be described in a general context of computer-executable instructions, the methods of the present disclosure can also be implemented in combination with other program modules and/or as a combination of hardware and software. The term module, or variants thereof, is used expansively herein to include routines, program applications, programs, components, data structures, algorithms, and the like. Modules can be implemented on various system configurations, including servers, network systems, single-processor or multiprocessor systems, minicomputers, mainframe computers, personal computers, hand-held computing devices, mobile devices, microprocessor-based, programmable consumer electronics, combinations thereof, and the like.

Computer readable media includes, for example, volatile media, non-volatile media, removable media, and non-removable media. The term computer-readable media and variants thereof, as used in the specification and claims, refer to storage media. In some embodiments, storage media includes volatile and/or non-volatile, removable, and/or non-removable media, such as, for example, random access memory (RAM), read-only memory (ROM), electrically erasable programmable read-only memory (EEPROM), solid state memory or other memory technology, CD ROM, DVD, BLU-RAY, or other optical disk storage, magnetic tape, magnetic disk storage or other magnetic storage devices.

The ROV 110 includes an abdomen 120 and wings 122 positioned on opposed sides of the abdomen 120. Referring to FIG. 3, the abdomen 120 and the wings 122 have a curved profile such that the profile of the ROV 110 conforms to the curvature of the outer surface of the core shroud 20. Generally, the curvature of each of the abdomen 120 and wings 122 is a function of the outer radius of a core shroud.

The ROV 110 is configured to conform to various core shroud 20 surfaces. For example, the ROV 110 is configured to conform to both a sixty inch radius core shroud and a one-hundred and ten inch radius core shroud. To conform to core shrouds 20 of different diameters, the wings 122 are each attached by a spring loaded hinge 124 to the abdomen 120. When installed on the core shroud 20, the ROV 110 is oriented with respect to the core shroud 20 such that the axis of each hinge 124 is substantially vertical or parallel to a longitudinal axis of the core shroud 20. The spring loaded hinges 124 bias the wings 122 towards the surface of the core shroud 20. The spring loaded hinges 124 include torsion springs. The range of travel of the wings 122 is restricted to a certain range so that the wings 122 remain open and the ROV 110 can be easily installed on the core shroud 20. The strength of the torsion springs is selected so as not to be too great such that the torsion springs don't disrupt the function of the attachment system described in further detail below. For example, the strength of the torsion springs is selected so as not to substantially force the abdomen 120 of the ROV 110 away from the core shroud 20. The strength of the torsion springs is also selected to be sufficient to hold elements of an inspection system against the core shroud 20 as described in further detail below.

Since the ROV 110 conforms to the outside surface of the core shroud 20, the ROV 110 is configured to be positioned close to the core shroud 20 and maintain a low profile. For example, the profile height can be measured as a distance in a radial direction from the surface of the core shroud 20. Referring to FIG. 1, the low profile of the ROV 110 is such that the ROV 110 is able to move under various core shroud structures 24 such as jet pumps and other obstructions in the annulus. For example, the ROV 110 has a maximum profile height of 1.7 inches. At this height, the ROV 110 can maneuver behind most obstructions in the annulus. Further, since the core shroud 20 has a curved profile, the curved shape of the ROV 110 maintains the height less than 1.7 inches even at the outer edges of the wings 122.

Referring to FIGS. 1, 2, 4, and 8, The ROV 110 includes elements of a vacuum system 130 that is configured to controllably adhere or force the ROV 110 to the surface of the core shroud 20. The vacuum system 130 creates a low pressure or vacuum space in a void 126 in the abdomen 120. The void 126 is defined by a sealing ring 132. The sealing ring 132 is configured to seal against the surface of the core shroud 20 to isolate the void 126 from the annulus so that the pressure in the void 126 can be reduced or otherwise controlled to adhere the ROV 110 to the surface of the core shroud 20. The sealing ring 132 is configured to move over obstacles on the surface of the core shroud 20. In general, the sealing ring 132 has a rounded profile and is made of a flexible material to allow the ROV 110 to travel over surface variations such as weld crowns. Exemplary sealing rings 132 include j-shaped polyurethane, foam, and the like. The foam sealing ring 132 is described in further detail.

Figure 8:
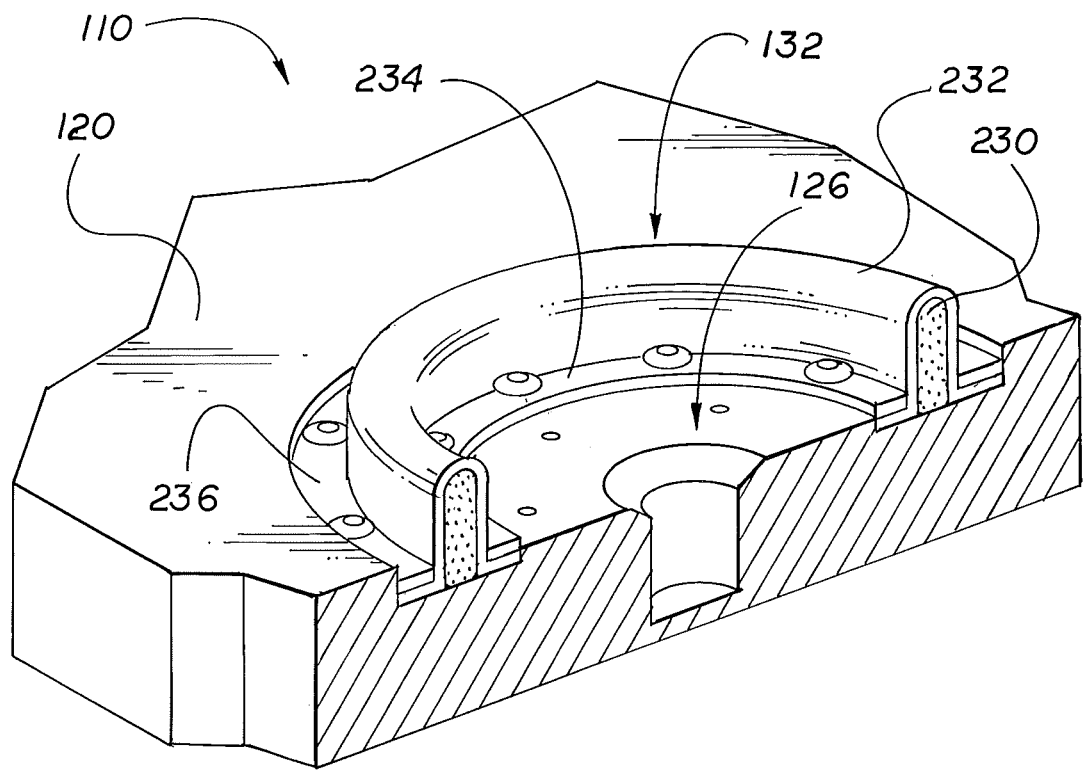
FIG. 8 is a partial cross-sectional perspective view of the vacuum system of FIG. 4.

Referring to FIG. 8, the sealing ring 132 includes a closed-cell foam ring 230 or skirt that is wrapped with neoprene-coated nylon cover 232. Timer and outer ring-shaped plates 234, 236 are bolted to the abdomen to hold the inner and outer edges of the nylon cover 232 to the abdomen and hold the nylon cover 232 over the foam ring 230. The foam ring 230 can compress and expand to move over obstacles while still maintaining a vacuum seal. The foam ring has been found to move over obstacles without folding and losing suction, which is a problem with certain other seal designs. The neoprene-coated nylon cover 232 protects the foam ring 230 such that the sealing ring 132 is durable and robust.

In certain embodiments, multiple sealing rings 132 are used such that if one sealing ring loses suction while moving over an impediment or obstacle, the ROV remains attached to the surface.

Referring to FIGS. 2 and 4, the vacuum system 130 further includes a venturi valve 134 or jet, a pump 136 or other pressurized water supply, and a hose 138 that connects the pump 136 to the venturi valve 134. The control unit 112 is configured to control the pump 136. The pump 136 draws water from the annulus and supplies the water to the venturi valve 134. The pump 136 can be located, for example, at the top of the core shroud 20 above the water level on the refueling floor. The pump 136 is configured to recirculate water already in the RPV 10.

The venturi valve 134 is configured displace water from the void 126 as a function of water pressure supplied by the pump 136. A channel 140 connects the void 126 to the flow path 142. The flow path 142 of the venturi valve 134 narrows and then expands in the flow direction such that pressurized water supplied by the pump 136 to the venturi valve 134 creates low pressure at a low pressure location 144 in the venture valve 134. The channel 140 connects to the flow path 142 at the low pressure location 144. As such, pressurized water supplied by the pump 136 through the venturi valve 134 draws water from the void 126 into the flow path 142 of the venturi valve 134 and lowers the pressure in the void 126. The venturi valve 134 does not require moving parts to lower the pressure in the void 126. Thus, the venturi valve 134 reduces the risk of breakdown of the vacuum system 130 and reduces the introduction of debris into the RPV 10. The venturi valve 134 allows for greater control of vacuum force as compared to using a pump to directly pump water from the void. The vacuum force provided by the venturi valve 134 is controlled as a function of pressurized water or pump flow from pump 136.

Referring to FIG. 2, the ROV 110 further includes a navigation system 150 that is configured to move the ROV 110 along the surface of the core shroud 20 to globally position ultrasonic probes, as described in further detail below. When moving, the ROV 110 maintains its orientation with respect to the core shroud 20 such that the profile of the ROV 110 matches the profile of the surface of the core shroud 20. The ROV 110 is configured to maneuver both horizontally and vertically using motor driven wheels. Generally, the ROV 110 translates and does not rotate.

The navigation system 150 includes a set of horizontal wheels 152 that are configured to move the ROV 110 horizontally or around the circumference of the core shroud 20. The navigation system 150 also includes a set of vertical wheels 154 that are configured to move the ROV 110 vertically or along the longitudinal axis of the core shroud 20. Referring to FIGS. 5 and 6, the horizontal wheels 152 are fixed in position and the vertical wheels 154 are configured to be retracted and extended. During a horizontal travel mode of operation illustrated in FIG. 5, the horizontal wheels 152 contact the surface of the core shroud 20 and the vertical wheels 154 are retracted so as not to be in contact with the surface of the core shroud 20. During a vertical travel mode of operation illustrated in FIG. 6, the vertical wheels 154 are extended to contact the surface of the core shroud 20 and to release the horizontal wheels 154 so that the horizontal wheels 154 are not in contact with the surface of the core shroud 20. The vertical wheels 154 are extended by actuation of pneumatic pistons 155 (shown schematically in FIGS. 2, 5, and 6) by the control unit 112. For example, such pneumatic pistons 155 are custom designed with a quad-ring seal and bronze insert for the cylinder. The vertical wheels 154 are retracted by water pressure at depth, vacuum attachment force, and/or tension springs (not shown).

Referring again to FIG. 2, each set of wheels 152, 154 is configured to be driven by the control unit 112 as motors 156, 158 that drive each set of wheels 152, 154 are controlled by the control unit 112. Wheels 152, 154 are configured to be independently actuated by the motors 156, 158 to facilitate correcting a direction of travel if necessary. Each set of wheels 152, 154 has independent non-driven wheels 162, 166 that provide positional feedback to the control unit 112. The non-driven wheels 162, 166 are passive and coupled to an encoder 160, 164. The encoders 160, 164 are used in conjunction with other sensors (not shown) such as rad-hardened inclinometers, gyroscopic sensors, depth sensors, and the like to determine the position of the ROV 110, and particularly the position of ultrasonic probes, on the surface of the core shroud 20. The material of the wheels is selected to comply with requirements for use in a Nuclear Power Plant and to have optimal friction coefficient when underwater and against the surface of the core shroud 20. In addition, the navigation system 150 includes ball rollers 168 that support the wings 122.

Figure 7:
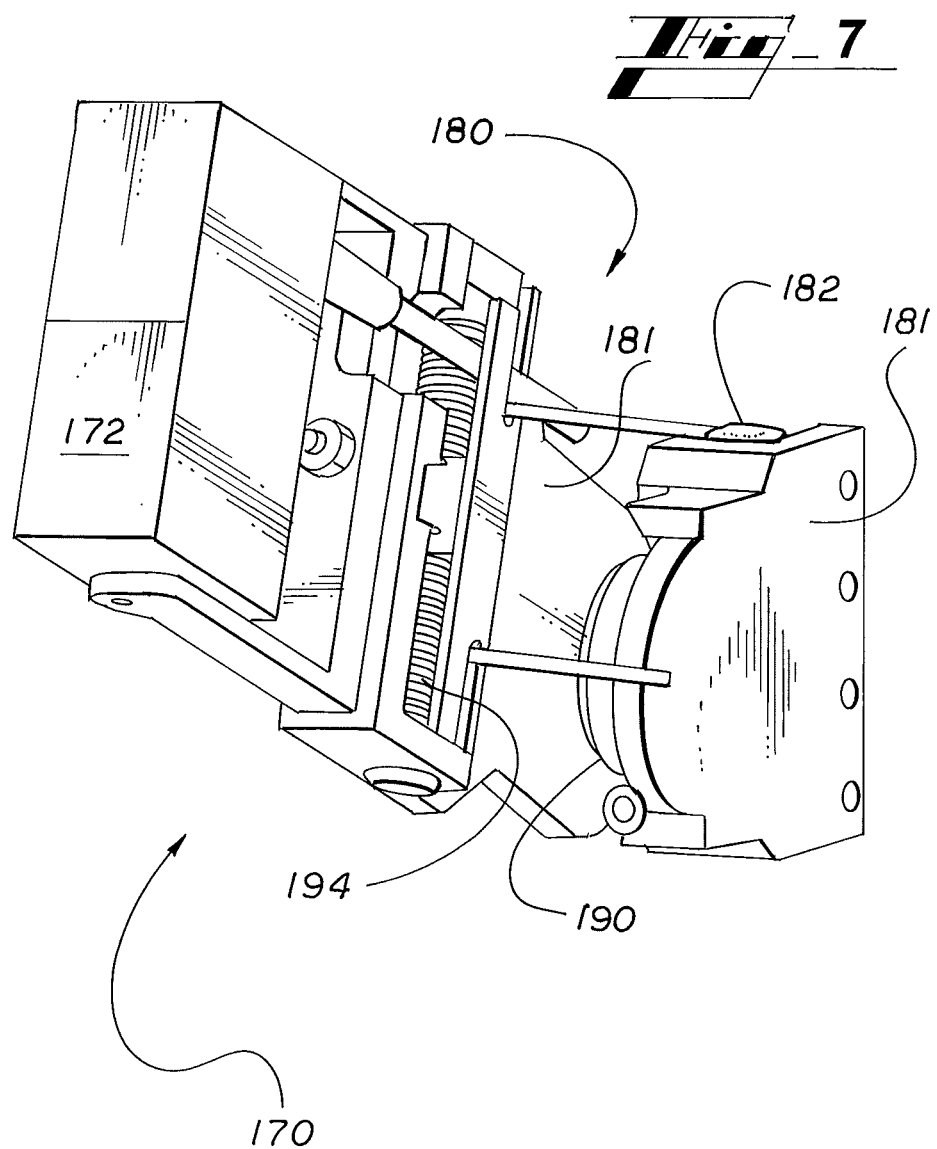
FIG. 7 is a partial perspective view of a weld scanning system of the ROV of FIG. 2.

Continuing with FIGS. 2 and 7, the ROV 110 includes a weld-scanning system 170 that is configured to inspect welds of the core shroud 20. The weld-scanning system 170 includes ultrasonic probes 172 and a probe positioning system 174 that is configured to locally position the ultrasonic probes 172 to inspect various welds. The probe positioning system 174 is configured to position the ultrasonic probes 172 to inspect welds of various orientations including horizontal welds, vertical welds, and welds at angles in between horizontal and vertical. The probe positioning system 174 includes scan arms 176 at the outer edges of the wings 122. In general, the scan arms 176 are substantially similar and symmetrically oriented. For purposes of teaching, one of the scan arms 176 is described in further detail and the description is applicable to each of the scan arms 176.

The scan arm 176 includes a rail 178 and a gimbal 180 that is attached to the rail 178 with a linear bearing 182. As an example, the rail 180 provides a scan length of two feet. The linear bearing 182 is selected based on reliability and minimal foreign material (FM) potential. A motion driving mechanism is configured to be actuated to move the gimbal 180 along the rail 178. For example, the motion driving mechanism includes a motor 184 that drives a lead screw 186. The motor 184 is coupled to the lead screw 186 using a belt or gear train so as to transmit torque to the lead screw 186. The lead screw 186 is coupled to the linear bearing 182. The motor 184 is offset from the lead screw 186 so as to minimally restrict movement of the gimbal 180 along the rail 178.

Each ultrasonic probe 172 is attached to one of the gimbals 180 and each gimbal 180 includes an actuated joint 190. An actuated motor 192 is configured to rotate a distal portion 181 of the gimbal 180 with respect to a proximal portion 181 of the gimbal 180 about the joint 190. In order to achieve reliable, robust rotation, a worm gear is used. This allows the mechanism to maintain a low profile as well as achieve a high gear ratio so a small motor may be used. During operation, the joint 190 is oriented such that a direction of rotation is substantially perpendicular to the surface of the core shroud 20.

The gimbal 180 includes torsion springs 194 that are configured to bias the ultrasonic probes 172 against the surface of the core shroud 20. A foreign material exclusion (FME) guard (not shown) is used to cover the torsional springs. The ultrasonic probes 172 are attached to the gimbal 180 so as to be able to rotate to be substantially in flat-face contact with the surface of the core shroud 20.

Each ultrasonic probe 172 is configured to be positioned along the length of an associated rail 178 and to be angularly positioned in a one-hundred and eighty degree range to inspect welds. The ultrasonic probes 172 can be positioned to inspect horizontal welds and vertical welds along the sides of the ROV 110 as well as above and below the ROV 110. The ultrasonic probes 172 can be moved and positioned independently of each other. The control unit 112 controls the actuation of the motors 184, 192 to position the ultrasonic probes 172.

Referring to FIGS. 1 and 2, the ROV 110 further includes a bail handle 200 to facilitate installing the ROV 110 with an arm 202. Generally, the arm 202 includes a pole 204 and a grabber 206 at the end of the pole 204 and is configured to install the ROV 110, for example, thirty to seventy feet underwater. The bail handle 200 is configured to be engaged by the grabber 206 and to center and align the ROV 110 in a substantially straight vertical position to facilitate attachment of the ROV 110 to the core shroud 20. The pole 204 is an offset handling pole that is configured to get around core spray lines and to access lower barrels or other core shroud structures 24. The grabber 206 is biased toward a closed position. The opening operation of the grabber 206 is driven by a piston to which air is supplied by an air pump (not shown). As such, in the event of supply air loss, the grabber 206 remains in the closed position and engaged to the bail handle 200.

The bail handle 200 includes raised outer edges 210 that slant toward a flat middle portion 212. The width W of the flat middle portion 212 is substantially equal to the width of the grabber 206. When the grabber 206 engages the middle portion 212, the ROV 110 is centered on the arm 202 and properly oriented to be installed. The raised outer edges 210 guide the grabber 206 toward the middle portion 212 as the bail handle 200 is engaged. As such, the bail handle 200 is configured to be consistently properly engaged by the grabber 206 even though it may be difficult to position the grabber 206 to engage the exact center of the bail handle 200.

A method of inspecting welds is now generally described. Each step is performed according to the execution of a software module of computer-executable instructions by the control unit 112. The installation arm 202 moves the ROV 110 to a position on the core shroud 20. The vacuum system 130 attaches the ROV 110 to the core shroud 20 and the arm 202 releases the ROV 110. The navigation system 150 moves the ROV 110 along the surface of the core shroud 20 to globally position the ROV 110. The probe positioning system 174 locally positions and orients the ultrasonic probes 172 with respect to a crack in a weld or another feature to be measured. The probes 172 measure the length and width of the crack and the measurement is recorded in the memory of the control unit 112. Selected steps are repeated as necessary to make further measurements.

The above-described embodiments are merely exemplary illustrations of implementations that are set forth for a clear understanding of principles. Variations, modifications, and combinations associated with the above-described embodiments may be made without departing from the scope of the claims. All such variations, modifications, and combinations are included herein by the scope of this disclosure and the following claims.

What is claimed is:

1. A remotely operated vehicle for inspecting a core shroud with an axis and an outside surface, comprising:
    an abdomen with a first side; and
    a first wing swingly connected through a first hinge to the first side of the abdomen;
    wherein the first hinge has an axis that is substantially parallel to the axis of the core shroud;
    wherein each of the abdomen and the first wing has a curved profile that is configured to conform to the outside surface of the core shroud; and
    wherein the first wing further comprises a rail and a gimbal attached to the rail through a linear bearing.

2. The remotely operated vehicle of claim 1, further comprising:
    a set of horizontal wheels that are configured to move the remotely operated vehicle around the outside surface of the core shroud; and
    a set of vertical wheels that are configured to move the remotely operated vehicle along the axis of the core shroud.

3. The remotely operated vehicle of claim 2, wherein at least one of the sets of wheels is configured to be retracted as not to be in contact with the outside surface of the core shroud.

4. The remotely operated vehicle of claim 1, comprising:
    an ultrasonic probe; and
    a probe positioning system that is configured to translate and rotate the ultrasonic probe.

5. The remotely operated vehicle of claim 1, further comprising a handle that is configured to guide an installation arm to a flat middle portion of the handle.

6. The remotely operated vehicle of claim 5, the handle comprising raised outer edges that are slanted toward the flat middle portion.

7. The remotely operated vehicle of claim 1, comprising a vacuum system that is configured to adhere the remotely operated vehicle to the surface of the core shroud, the vacuum system comprising:
    a venturi valve that is configured to draw water from a void in the remotely operated vehicle; and
    a pump configured to supply water pressure to the venturi valve.

8. The remotely operated vehicle of claim 7, the vacuum system comprising a sealing ring that defines the void.

9. The remotely operated vehicle of claim 8, the sealing ring comprising a foam ring and a cover over the foam ring.

10. The remotely operated vehicle of claim 1, wherein the first hinge is spring loaded to bias the first wing toward the outside surface of the core shroud.

11. The remotely operated vehicle of claim 10, wherein the spring loaded hinge includes a torsion spring.

12. The remotely operated vehicle of claim 1, wherein the rail is substantially parallel to the axis of the core shroud.

13. The remotely operated vehicle of claim 12, further comprising a motion driving mechanism connected to the gimbal for moving the gimbal along the rail.

14. The remotely operated vehicle of claim 1, wherein the curved profile of each of the abdomen and the first wing has a curvature that is a function of an outer radius of the core shroud.

15. The remotely operated vehicle of claim 1, wherein the abdomen includes a second side opposite the first side;
    wherein a second wing is swingly connected through a second hinge to the second side of the abdomen;
    wherein the second hinge has an axis that is substantially parallel to the axis of the core shroud; and wherein the second wing has a curved profile that is configured to conform to the outside surface of the core shroud.

16. The remotely operated vehicle of claim 15, wherein the curved profile of each of the abdomen, the first wing, and the second wing has a curvature that is a function of an outer radius of the core shroud.

17. The remotely operated vehicle of claim 15, wherein the first hinge is spring loaded to bias the first wing toward the outside surface of the core shroud and the second hinge is spring loaded to bias the second wing toward the outside surface of the core shroud.

\* \* \* \* \*